Dec. 19, 1967     H. L. DRYDEN, DEPUTY     3,359,046
ADMINISTRATOR OF THE NATIONAL AERONAUTICS
AND SPACE ADMINISTRATION
BISMUTH-LEAD COATINGS FOR GAS BEARINGS USED IN
ATMOSPHERIC ENVIRONMENTS AND VACUUM CHAMBERS
Filed Oct. 22, 1965
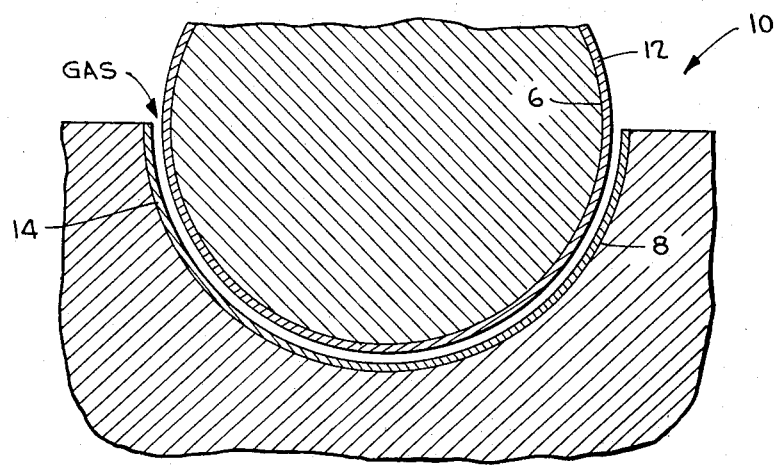
INVENTORS,
LUKE J. GABROVIC
HAROLD M. LAMPERT
BY Carl Levy
ATTORNEY United States Patent Office 3,359,046
Patented Dec. 19, 1967

3,359,046
BISMUTH-LEAD COATINGS FOR GAS BEARINGS USED IN ATMOSPHERIC ENVIRONMENTS AND VACUUM CHAMBERS
Hugh L. Dryden, Deputy Administrator of the National Aeronautics and Space Administration, with respect to an invention of Luke J. Gabrovic and Harold M. Lampert, both of Dickinson, Tex.
Filed Oct. 22, 1965, Ser. No. 502,693
11 Claims. (Cl. 308—9)

ABSTRACT OF THE DISCLOSURE

Gas bearings are rendered non-galling by providing coatings on the mating surfaces thereof, one of the surfaces being provided with a film of bismuth and the other with a film of lead.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates generally to gas bearings for such applications as gyroscope and satellite test supports and, more particularly, to surfaces for such bearings whereby contact therebetween will not cause deformation to such a degree as to render the bearing inoperative. Specifically this invention relates to a technique for treating surfaces in a gas bearing assembly by coating the facing surfaces with different metals, which, when contacted by each other do not gall to form gross irregularities which would allow the gas support to channel and thereby destroy the bearings effectiveness.

The development of gas bearings has been accelerated by the requirements of the space age which has rendered the standard surface wear bearings impractical. This has proved particularly true in the case of satellite simulators and test stands where free movement is an absolute essential to duplicate motions which will be encountered in space operations. In order to provide such free movement support with minimal friction the gas bearing with its film of gas between bearings surfaces, either spherical or cylindrical, has, for practical purposes, eliminated friction but in so doing has created new and different problems. Among these one of the most deleterious to free movement gas bearing operations has been sudden jolts which are of such force as to bring one of the bearing surfaces in contact with the other. By such contact one or both of the surfaces may be galled forming crevices in the faces which allow uneven gas flow patterns. This immediately renders the gas bearing inoperative since the gas supply will channel through the crevice leaving insufficient pressure to support the remaining bearing area. Although this problem is manifest in all gas bearings it is particularly prevalent in the spherical type where the tolerances are much closer and reworking the galled surfaces much more difficult.

The industry has attempted to alleviate this problem by a number of alternative techniques. In the case of the spherical bearing, provision is made for support and bumper rings around the upper edge of the hemispherical support surfaces. By this technique when the spherical ball is at rest it only touches the rings of Teflon or like material which do not effect the ball surface. These rings also act as bumpers which deflect the ball during slight shock or load shift during bearing operation. However, such rings must either be removed or be sufficiently narrow as to permit only slight height differences between the hemispherical seat and the support ball during bearing operations. Of course when removed they can not intercept ball-seat collision while if they are too thin sudden severe shocks are not absorbable, the rings being deflected with the ball contacting its seat with resultant galling of one or both of the facing surfaces.

The use of fluid lubricants has similarly been proposed as a means to prevent contact between the two faces of the bearing assembly. This technique has proven quite satisfactory in gyroscopic applications where the loads are minimal but such technique has been unsuitable to satellite support stands where the weights are substantial, the lubricants failing to provide a film strength sufficient to maintain the shock motion of the heavy supported satellite. Further, such lubricants are expensive and require auxiliary containment and supply systems which complicate the basic gas bearing structure. These problems are compounded by operation of the bearing in vacuum or special environments.

As pointed out the galling of the bearing surface results in improper gas flow requiring an abort of the particular test being conducted. This alone dictates a time consuming delay while a new bearing structure is installed. The parts removed must be remachined or otherwise modified before they can be reutilized in the gas bearing assembly and if substantial machining is necessary, the bearing becomes either undersize (ball) or oversize (hemispherical mounting) and thereby useless.

Therefore it is an object of the present invention to provide a technique for rendering gas bearings substantially non-galling;

It is a further object to provide a treatment of such structures which does not require lubricants in the gas stream or complicated gas and lubricant supply and recovery systems;

It is still a further object of the present invention to provide an anti-galling film on gas bearing surfaces which are substantially uneffected by instantaneous contact therebetween;

Another object of this invention is the provision of an anti-galling coating which may be utilized with worn bearing surfaces, such coating repairing any irregularities therein thereby saving rework.

A further object of this invention is to provide a surface coating for gas bearing structures which will not allow metal to metal contact between the bearing faces even under the most violent shock conditions;

A still further object of the invention is the provision of a unique combination of coating materials for use with gas bearings which will not seize when contact is made therebetween either while the gas bearing is in operation or at rest;

Another of the objects is the provision of non-galling gas bearing surfaces which are operable and substantially uneffected by most atmospheric operating conditions including vacuums.

These and other objects will become apparent from the following detailed description taken with the accompanying drawing in which:

The figure is a sectional view of the structure employed in the practice of the present invention.

Briefly, the instant invention meets the enumerated objects by providing, as shown in the drawing, different coatings to the mating surfaces 6 and 8 of the gas bearing structure generally designated 10, one coating being bismuth 12 and the other lead 14. These coatings are in the form of thin films generally applied and smoothed by mechanical burnishing techniques although other methods of application are applicable such as evaporation, chemical deposition, etc. The specific structure of the gas bearings to which this invention is applicable forms no part thereof, such being well known to the art and comprising the subject matter of many patents and publications.

The coatings noted above are usually applied to the surfaces of the bearings during manufacture in order to provide uniformity in manufacture and interchangeability of bearing segments. However, the concepts involved are equally applicable to worn bearings wherein the coating and burnishing act to repair any gross irregularities in the balls or seats. This latter feature includes the use of the coating on worn gas bearing surfaces whether they be made of steel or other hard metals alone or such metals which have previously been covered with the films of the instant invention and subsequently damaged in shipment or use.

The coatings applied in the instant invention must be thick enough to act as an anti-galling barrier between the bearing faces while thin enough to withstand the pressures and operating conditions without eroding. It has been discovered that film thicknesses in the order of .0001 to .01 inch will function as desired although most satisfactory results are obtained with thicknesses between .001 and .005 inch. This is particularly true in reworking where a larger variation in base surfaces are encountered.

The two metals noted above i.e. bismuth and lead have been found to provide the best combination of properties including longest wear times and easiest handling of the many metals tested for use in the gas bearing environments. If the bismuth is applied to the ball, the lead will be coated on the seat or vice versa, either system providing the same results. In the case of gas bearings for such applications as gyroscopes, wherein the gyroscope bearing is generally cylindrical, the same principle is applicable with the journal portion being coated with one metal e.g. bismuth and the thrust bearing surfaces coated with the other i.e. lead.

With the gas bearing surfaces coated as proposed above the operating gas bearing will function as intended without interference from the coatings. However should there be a sudden shock which causes the supported ball or journal to shift against the support the coatings of the instant invention perform their intended function i.e. prevention of galling. Although applicant does not desire to be bound by any theory of operation it has been considered that the effectiveness of the instant proposal is due to the unique combination of physical properties of the materials selected, particularly their melting points and their relative inertness to one another and the base bearing material such as stainless steel. When the two coating materials contact one another it has been theorized that their melting points are such that an immediate flow temperature condition is created by the impact and the sliding friction of one bearing surface over the other. Since the contact time is in the order of a few microseconds the coating metals do not have time to set in the distended pattern but rather, with the retained heat of friction are maintained in the molten state which, by surface tension and other surface phenomena tend to return to the smooth initial state.

Although many metals have relatively low melting points and would act in a similar manner to the lead-bismuth combination, none has been found to be as satisfactory as in this gas bearing application. This is considered due to the numerous other criteria which the bearing films must meet. Of particular importance are the factors of high stability under all conditions of radiation, temperature and vacuum. Further the coating film must not part to allow this metal exposure or transfer from one coating to the other during impact. Also the film coatings must be burnishable or otherwise workable to a smooth condition which fills any voids or cracks in the base bearing material without leaving air or gas pockets.

The combination of lead (melting point 327.4° C.) and bismuth (melting point 271° C.) was discovered to best meet all of these requirements. Films of lead or bismuth alone fail to meet the test while numerous other low melting metals either alone, as eutectics, or in combination did not function satisfactorily.

*Example I*

An air bearing ball for satellite support was coated with a burnished smooth lead film of .0002 inch thickness. The seat for the bearing was coated with a burnished smooth bismuth film of .0002 inch thickness. Both the ball and seat were of pre-machined smooth hardened 420 stainless steel. Operation of the support under vacuum in a satellite support test showed a uniform constant air cushion around the bearing during the test. Induced contact between the ball and seat showed no visible galling which would be evidenced by stiration or pitting of the bearing surface. The ball and seat maintained a high conformity during the entire test.

*Example II*

A similar test under atmospheric conditions was made with the films of .0003 inch thickness applied to the bearing surfaces which had previously been galled and rendered inoperative. The new smooth film functioned in an identical manner to the films of Example I with no noticeable decrease in the effectiveness of the bearing due to the induced ball-seat contact.

It will be apparent that numerous changes and modifications can be made in the manner of film applications or operational details of my invention and I wish it understood that I do not desire to be bound to the details of the invention described, my invention including all of the modifications encompassed by the following claims.

What is claimed is:

1. In a gas bearing including mating seat and ball surfaces, the coating of one of the surfaces with a thin smooth film of bismuth and the other of the surfaces with a thin smooth film of lead whereby contact between the two surfaces is non-galling.

2. The gas bearing of claim 1 wherein the films have a thickness of from .0001 to .01 inch.

3. The gas bearing of claim 1 wherein the film thickness is from .001 to .005 inch.

4. The gas bearing of claim 3 wherein the seat surface is coated with bismuth and the bearing surface is coated with lead.

5. The gas bearing of claim 3 wherein the seat surface is coated with lead and the bearing surface is coated with bismuth.

6. A method of rendering mating seat and bearing surfaces of gas bearings non-galling comprising coating one of said surfaces with a thin film of lead and the other of said surfaces with a thin film of bismuth.

7. The method of claim 6 wherein after coating the thin films are smoothed by mechanical burnishing.

8. The method of claim 6 wherein the film thicknesses are from .0001 to .01 inch.

9. The method of claim 6 wherein the film thicknesses are from .001 to .005 inch.

10. The method of claim 9 wherein the seat surface is coated with lead and the bearing surface is coated with bismuth.

11. The method of claim 9 wherein the seat surface is coated with bismuth and the bearing surface is coated with lead.

References Cited

FOREIGN PATENTS 901,004    7/1962    Great Britain.

OTHER REFERENCES

Why Bearing Seize, published in General Motors Engineering Journal; September-October 1965.

MARTIN P. SCHWADRON, *Primary Examiner.*